April 9, 1957 P. D. IVANOFF 2,788,211
AMUSEMENT AND THERAPEUTIC DEVICE
Filed April 9, 1952 2 Sheets-Sheet 1
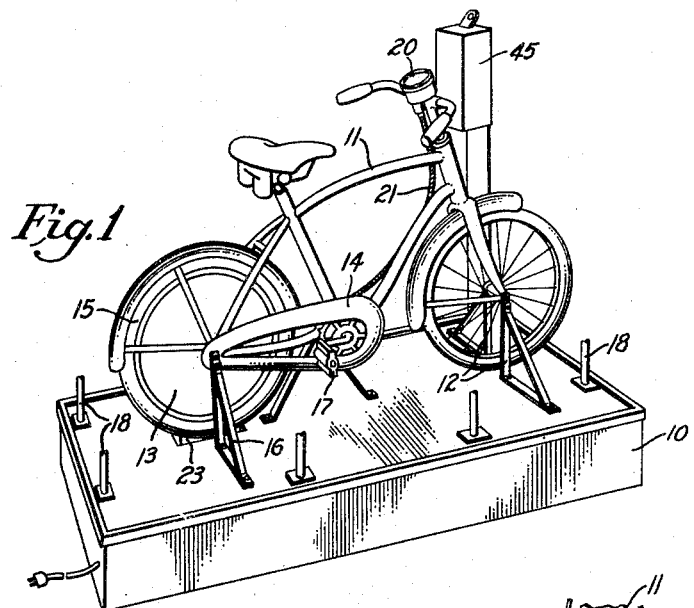
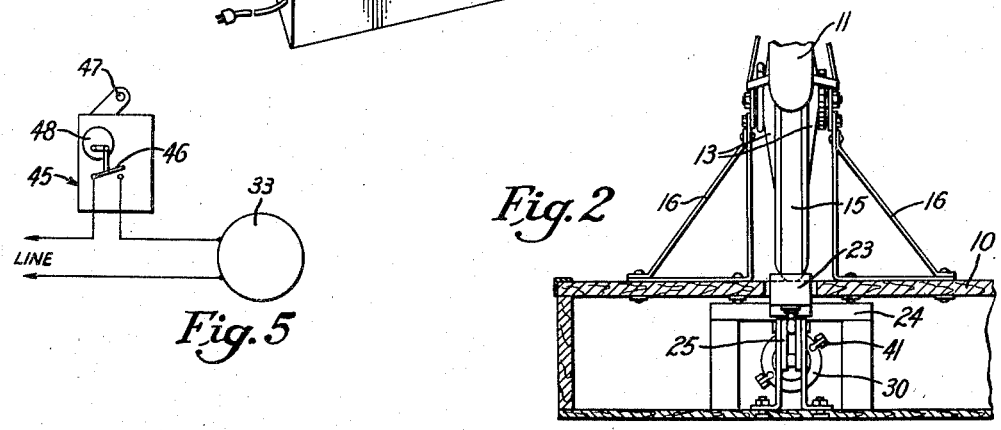
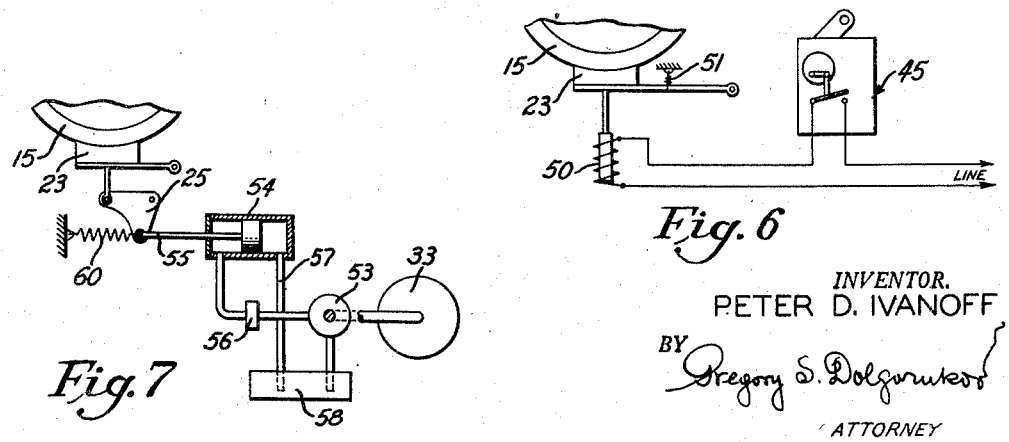
INVENTOR.
PETER D. IVANOFF
BY Gregory S. Dolgorukov
ATTORNEY April 9, 1957  P. D. IVANOFF  2,788,211
AMUSEMENT AND THERAPEUTIC DEVICE
Filed April 9, 1952  2 Sheets-Sheet 2

INVENTOR.
PETER D. IVANOFF
BY Gregory S. Dolgorukov
ATTORNEY.

United States Patent Office 2,788,211
Patented Apr. 9, 1957

2,788,211

AMUSEMENT AND THERAPEUTIC DEVICE

Peter Dimitry Ivanoff, Dearborn, Mich.

Application April 9, 1952, Serial No. 281,297

4 Claims. (Cl. 272—73)

This invention relates to amusement devices and more particularly to an amusement device which can also be used as a physiotherapeutic device such as for exercise of convalescing patients. In one of its aspects the invention relates to a device of this general nature having a time control which, in turn, may be coin-operated.

One of the objects of the present invention is to provide an improved amusement device including a bicycle which may be used indoors and in a very limited space such as in a store, a room, or a basement, and yet enable the user to get a feeling of riding a bicycle or testing his speed, and to have a feeling of being engaged in a bicycle race.

Another object of the present invention is to provide an improved device enabling its users, particularly children, to learn riding a bicycle without being subjected to the danger of falls or getting into an accident, the chances of which are greatly increased when a child is only learning to ride a bicycle.

A further object of the present invention is to enable children that own a bicycle to use it not only during the summer but also in winter when such a bicycle is usually stored in the basement and cannot otherwise be properly or safely used.

A still further object of the invention is to provide an improved device whereby a child is given an opportunity of healthy exercise during winter and of developing muscles required for bicycle riding, without being exposed to dangers and bad weather prevailing during the winter season.

A still further object of the present invention is to provide an improved amusement device which can give a child who cannot afford a bicycle, or does not have one available for him, to have a thrill of riding a bicycle and even of having a bicycle race, with expenditure of only a few cents.

A still further object of the present invention is to provide a device which can be used in schools, gymnasiums, hospitals and similar institutions to give exercise to children or convalescing patients, means being provided whereby the time limit of such exercises can be selectively set by those directing such exercises.

It is an added object of the present invention to provide an improved device of the foregoing nature which is simple and rugged in construction, safe and dependable in operation and relatively inexpensive to manufacture.

Further objects and advantages of this invention will be apparent from the following description and appended claims, reference being had to the accompanying drawings forming a part of this specification, wherein like reference characters designate corresponding parts in the several views.

Fig. 1 is a perspective view showing a coin-operated device embodying the present invention, the railing being broken off in order not to obscure the drawing.

Fig. 2 is a view, partly in section, taken on the rear wheel of the bicycle utilized therein and showing the details of mounting thereof as well as of the control brake.

Fig. 5 is an electrical diagram showing electrical means for controlling brake-actuating means.

Fig. 6 is a diagrammatic view showing brake-actuating means of a modified construction and including a solenoid.

Fig. 7 is a diagrammatic view showing brake controlling means of a modified type and including a fluid-operated cylinder.

Figure 3:
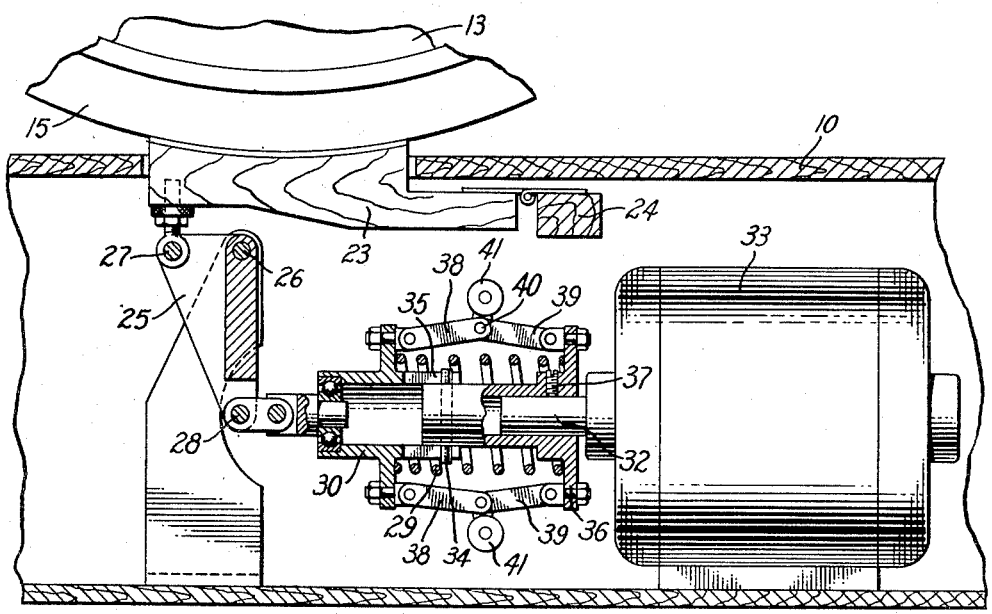
Fig. 3 is a view illustrating the brake-controlling means releasing the device for operation, the parts being shown in positions with the brake applied to the rear wheel of the bicycle.
Figure 4:
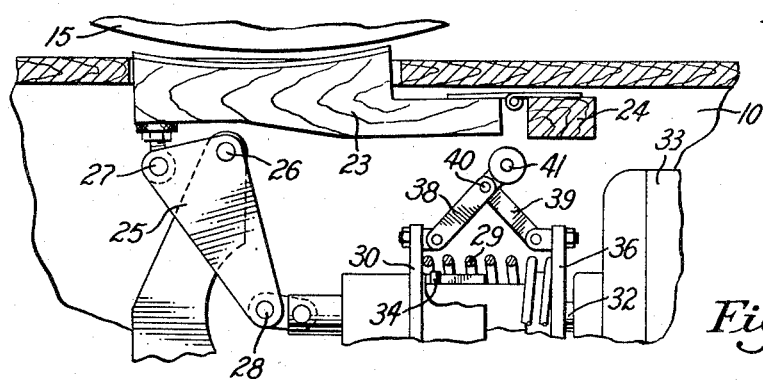
Fig. 4 is a view similar in part to Fig. 3 but showing said parts in positions with the brake released.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed here is for the purpose of description and not of limitation.

In accordance with the invention I provide suitable means, such as a base or a stand, on which a conventional bicycle is mounted in an upright position and is adapted to be pretentiously propelled, i. e., to have its pedals rotated by a person, usually a child, which can mount the bicycle and operate the same while being prevented from falling by the fixing means of suitable nature holding the bicycle to the stand. I prefer to have the front wheel rest firmly on the stand, and be kept in straight position by suitable brackets or similar means. I also prefer to have the rear wheel supported at the axle with its tire raised from the floor of the stand or base to permit rotation of the wheel and therefore rotation of the pedals.

A speed indicator or speedometer of any suitable type is provided, whereby the propelling effort of the bicycle user is evaluated, preferably in M. P. H. and is made visible and audible to the child, and to the others, if desirable. A conventional speedometer having flexible shaft connection to the rear wheel may be successfully employed. The device may be made and sold either with the bicycle already installed on the stand, or in the form of a portable stand adapted to receive a bicycle that may already be available to the user of the stand. The latter construction enables a child to use the bicycle also during the winter months when such bicycles are usually taken to the basement and merely occupy space therein.

The device may be provided with a time control which includes a brake normally applied to the rear wheel of the bicycle to make the entire device inoperative. By manipulating the time control the brake may be released for predetermined periods of time, thus releasing the brake and permitting user to propel the bicycle for a definite period of time which, may be either permanently fixed or be varied. Such device may be particularly useful in hospitals and similar institutions, as well as in schools.

The device with the bicycle already installed may be made coin-operated and installed in dime stores, amusement parks, and the like. With such construction, the device includes a brake normally making the pedals locked. When the coin is inserted into the coinbox, the brake is automatically released and remains released for a predetermined period of time, such as 1–2 minutes. Means releasing the brakes may be mechanical, hydraulic, pneumatic, or of the solenoid type, electrically controlled as hereinafter described.

Means may be provided to impose an additional load adapted to resist rotation of the pedals and thus to make exercise more realistic. Such means may be of any suitable form. A water brake or an air blower may be used with success. If a blower is used, it is advantageous to lead the delivery conduit thereof forwardly of the bicycle and send the discharging air toward the occupant of the bicycle, thus imitating the rush of air as in actual bicycle riding. It will be appreciated that such a rush of air or wind will be proportional to the rotative speed of the pedals, as in actual bicycle riding. Means are provided whereby the direction of the air discharge may be changed, which feature may be desired if the basement or the room in which the bicycle is installed is too cold for comfort. The latter expedient may also be useful in order to keep young boys usefully occupied during the winter by letting them circulate the air in the basement and facilitating drying of the laundry which is usually, during the winter months, hung for drying in the basement. With such means the speed indicator may be of the Pitot tube type as in aircraft, thus providing an additional thrill for the youngsters. A soft and pleasing sounding siren may also be employed, thus giving the boy a still further thrill and giving indication to the parents that the boy in the basement is on the bicycle and not in any difficulty.

In the drawings there are shown, by way of example, devices embodying the present invention. Referring particularly to Figs. 1–5, the device illustrated therein comprises a base or stand 10 of a hollow construction and adapted to house within itself the control mechanisms described in detail below. On the base 10 there is mounted in an upright position a bicycle 11 of any suitable type. The front wheel of the bicycle rests firmly on the top of the base 10 and is kept from turning with the aid of brackets 12. The rear wheel 15 is slightly raised above the top or floor of the stand 10 and is supported in such raised position by the brackets 16. Thus, the pedals 17 of the bicycle and the rear wheel 15 thereof may be rotated as fast as the person using the bicycle can.

Means are provided to evaluate such rotating effort or capacity of the occupant and to give him a visual indication thereof. In the embodiment of Figs. 1–5 such means are in the form of a speedometer 20 operatively connected with the aid of flexible shaft 21 to the axle of the rear wheel 15.

The device of Fig. 1 is a coin-operated device particularly adapted for installation in amusement parks and stores. It includes means whereby the device remains inoperative unless the coin is inserted into the coinbox; after the coin is inserted the device is free for operation only for a definite period of time, such as one minute or more, but is automatically locked again after this period expires.

The bicycle 11 is provided at the rear wheel 15 with discs 13 covering the spokes of the wheel, and a safety cover 14 covering the chain drive and the sprocket wheel. This precaution is necessary in order to prevent small children from sticking their hands either into the rotating wheel or into the chain drive. Since the front wheel of the bicycle 11 is stationary, no such provision is required therein. Railing such as 18 (broken off for the sake of clarity of the drawing) may be provided.

Desired operation of the device is ensured by the provision of a brake shoe 23 operatively installed on the base, such as by being hinged on a cross bar 24. Means are provided to maintain the brake shoe 23 constantly pressed against the tire of the wheel 15 unless an overwhelming force operates to pull brake shoe 23 away from the tire of the wheel 15. In the present embodiment such means are exemplified by a bell crank 25 hinged as at 26 and having one of its ends connected to the brake shoe 23 as at 27, while its other end is connected, as shown at 28, to a centrifugal switch mechanism, including a compression spring 29 adapted to act on a hub 30 slidable on the extension 31 of the hub 36 secured to the shaft 32 of an electric motor 33. The hub 30 is drivingly connected to the sleeve 31 with the aid of a pin 34 engaging said hub 30 at a slot 35. Thus, the hub 30 is permitted to slide on the extension 31 and yet to transmit the driving force from the extension 31 to the hub 30 through said pin 34. By virtue of such a construction the spring 29 pressing on the hub 30 moves the lower end of the bell crank 25 to force the brake shoe 23 against the wheel 15.

The releasing means adapted to pull the brake shoe 23 away from the wheel 15 are exemplified by a plurality of linkages connecting the sliding hub 30 with the stationary hub 36 secured to the shaft 32 of the motor with the aid of a set screw 37, or other suitable means, as mentioned.

Each of the linkages includes links 38 and 39 hinged to the hubs 30 and 36, respectively, and connected together as at 40. A weight 41 is carried by the linkage at said connection 40.

As the current controlling the motor 33 is switched on, the hubs 36 and 30 begin to rotate at a relatively high speed. In consequence thereof, the centrifugal force acting on the weights 41 tends to draw them outwardly and to bring the parts of the mechanism into the positions illustrated in Fig. 4. It can be appreciated from an examination of said figure that the outward movement of the weight 41 causes the linkages to pull the sliding hub 30 toward the motor in opposition to the compression spring 29, moving the bell crank to pull the brake shoe away from the wheel 15 thus permitting rotation of the pedals of the bicycle, i. e., use of the device.

Means are provided whereby the electric current controlling the motor 33 is switched on only when the coin is inserted into the coin-box 45. Control mechanisms of this general nature are well known in the art and need not be described in detail herein except in a general manner such as shown in Fig. 5. Such a mechanism includes an electric switch 46 adapted to close the line to the motor 33 when the coin is inserted at the coin-receiving head 47. A clock or timing mechanism 48 is started when the switch 46 closes, and it runs for a predetermined period of time, such as one minute or one and a half minutes, as set, whereupon the switch 46 is again opened.

By long experimentations with various types of mechanisms for actuating the brake I have found that mechanisms of the centrifugal type, such as the one described above give gradual and soft application of the brake. Mechanisms of other types, and particularly those including solenoids, give a considerable impact which under some conditions may be objectionable and require additional means to counteract such impact or noise. However, it will be understood that means of various types capable of controlling brake shoe 23 directly or through a bell crank may be used.

Fig. 6 shows diagrammatically a brake-actuating mechanism including a solenoid. On such a mechanism a solenoid 50 is electrically connected to the line and is controlled by the electrical system of the coin-box 45, similarly to the motor 33 of the construction of Figs. 1–5. The solenoid 50 is also mechanically connected, either directly or through a suitable lever or bell crank, to the brake shoe 23 acting on the wheel 15. Solenoid 50 acts in opposition to a suitable spring tending to keep the brake shoe applied.

Fig. 7 illustrates a construction in which the centrifugal mechanism is substituted by a hydraulic or pneumatic device. With such a construction the motor 33 is controlled by the coin-box 45 in a manner shown in Fig. 5, while the bell crank 25 acts on the brake shoe 23 which, in turn, acts on the wheel 15. With such a construction the motor 33 drives a pump 53 operating a cylinder 54 having a piston slidably mounted therein and having a piston rod 55 connected to the bell crank 25. A suitable valve box 56 is provided to pass the fluid into the sump reservoir 58 on the return stroke of the piston. A leakage conduit 57 may also be provided if desired. In operations the connecting rod 55 pulls on the bell crank 25 and releases the brake shoe 23 in opposition to the action of a tension spring 60 which acts on the bell crank 25 in the opposite direction and tends to maintain brake shoe 23 constantly applied to the wheel 15.

Figure 8:
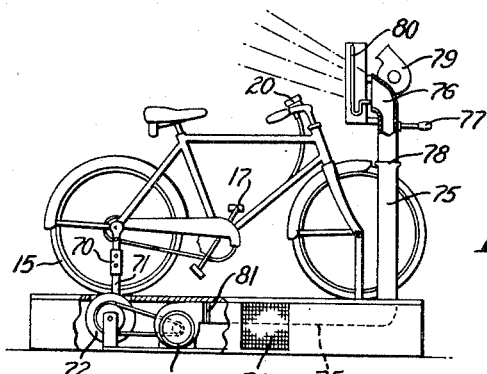
Fig. 8 is a view showing a modified device embodying the present invention and adapted particularly for use when utilization of bicycles during the winter is desired in homes.

Fig. 8 illustrates a stand which may be sold separately and is adapted to receive bicycles of various makes and sizes. In order to accommodate bicycles that may have different diameters of the wheels or sizes of tires, an adjustment 70 is provided in the rear wheel supporting bracket 71. The rear wheel 15 of the bicycle rests on a drum 72 connected, such as by means of a belt and pulley drive, with a blower 73 having an intake conduit connected to a register or grill 74 through which the air is drawn into the blower.

To the discharge end of the blower 73 there is connected an air conduit 75 brought up to the front of the stand and carried upwardly to terminate in a discharge end 76 adapted to direct the air toward the face of the bicycle occupant. The upper end of the conduit 75 may be turned around and selectively arranged in different positions to direct air in any desirable direction. Such turning may be effected from the seat of the bicycle with the aid of a handle 77, effecting rotation of the upper section of the conduit at a joint 78. A siren, preferably having a pleasing and soft sound, may be connected to the discharge end 76 and be selectively connected and disconnected from the air stream to produce a sound changing its pitch with the speed of the air stream and, consequently, proportional to rotative speed of the wheel 15. A speedometer 20, similar to that shown in Fig. 1 and operating in the same manner, may be provided.

In addition, or instead of the speedometer 20, a Pitot tube speed indicator 80 may be provided on the discharge end 76 to be operated by the air stream produced by the blower 73 and thus to give visual indication to the bicycle occupant of the rotative speed of the wheel 15. The advantage of such a speed indicator lies in the fact that it need not be directly connected to the bicycle and therefore may be supplied with the stand at a relatively low price and eliminate the necessity of providing a speedometer on the bicycle.

It will be understood that driving the blower 73 imposes a driving load on the bicycle pedals 17, which driving load may be varied by operating a damper or shutter 81 adapted to vary the area of the discharge conduit of the blower from zero to its maximum and thus to change selectively the back pressure against which the blower is made to operate. This, in turn, varies the load on the bicycle pedals.

There are thus provided devices of the character described whereby objects of the present invention and numerous additional advantages are attained. It will be understood that other instrumentalities than bicycles, be they foot or hand operated for pretentious propulsion may also be used with success, and attaining the objects listed above.

I claim:
1. A device of the character described comprising a base, a bicycle mounted on said base in an upright position, a support for the bicycle at least at the axle of the rear wheel thereof to provide for rotation of the rear wheel, a speed indicator mounted for observation from the seat of the bicycle and operatively connected to the rear wheel, a brake shoe adapted to be applied to the rear wheel of the bicycle for stopping the same, a centrifugal device adapted to apply said shoe to the rear wheel of the bicycle and to withdraw it from the bicycle wheel; an electrical circuit connected to a source of electrical energy and including a motor adapted to rotate said centrifugal device when the circuit is closed, and a coin-operated timing mechanism adapted to close the circuit for a predetermined period of time when a coin is inserted thereinto and to open the circuit after the expiration of said period.

2. The construction defined in claim 1, with spoke covering discs being provided on the rear wheel and rotatable therewith and the front wheel resting on the base.

3. A device of the character described comprising a base, a bicycle mounted on said base in an upright position, a support for the bicycle at least at the axle of the rear wheel thereof to provide for rotation of the rear wheel, a speed indicator mounted for observation from the seat of the bicycle and operatively connected to the rear wheel, a brake adapted to be applied to the rear wheel of the bicycle for stopping the same, a bell crank hinged on the base and having one of its ends connected to said brake for actuating the same, a centrifugal device connected to the other end of the bell crank and including spring means adapted to exert force on the bell crank to keep the brake applied, said centrifugal device being adapted to move the bell crank to release the brake when rotated above a predetermined speed; an electric circuit connected to a source of electric energy and including a motor adapted to rotate the centrifugal device when the circuit is closed, and a coin-operated timing mechanism adapted to close the circuit for a predetermined period of time when a coin is inserted thereinto and to open the circuit after the expiration of said period.

4. The construction defined in the preceding claim 3, the base being of a hollow construction, with the bellcrank, centrifugal device, and the motor being installed within the base.

References Cited in the file of this patent
UNITED STATES PATENTS

| | | |
|---|---|---|
| 590,783 | Williams | Sept. 28, 1897 |
| 847,725 | Biondi | Mar. 19, 1907 |
| 984,780 | Savage | Feb. 21, 1911 |
| 1,245,350 | Hurwitz | Nov. 6, 1917 |
| 2,106,024 | Wood | Jan. 18, 1938 |
| 2,198,058 | Mobeck | Apr. 23, 1940 |
| 2,504,007 | De Clercq | Apr. 11, 1950 |

FOREIGN PATENTS

| | | |
|---|---|---|
| 475,207 | Great Britain | Nov. 16, 1937 |